(12) United States Patent
Kato et al.

(10) Patent No.: US 7,167,450 B2
(45) Date of Patent: Jan. 23, 2007

(54) NETWORK MANAGEMENT METHOD AND COMMUNICATIONS NETWORK SYSTEM

(75) Inventors: Kei Kato, Chiba (JP); Cai Dong Wang, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1159 days.

(21) Appl. No.: 09/799,523

(22) Filed: Mar. 7, 2001

(65) Prior Publication Data
US 2001/0036180 A1 Nov. 1, 2001

(30) Foreign Application Priority Data
Apr. 28, 2000 (JP) .............................. 2000-128872

(51) Int. Cl.
*H04J 3/14* (2006.01)
(52) U.S. Cl. .................................................... 370/236
(58) Field of Classification Search ................ 320/235, 320/236, 241, 250–253, 420, 431, 432, 449
See application file for complete search history.

(56) References Cited

U.S. PATENT DOCUMENTS 5,056,085 A * 10/1991 Vu .............................. 370/400
5,337,307 A * 8/1994 Sato et al. .................... 370/397
5,634,097 A * 5/1997 Ashi et al. .................... 714/45
5,793,976 A * 8/1998 Chen et al. ................... 709/224
5,825,751 A * 10/1998 Papierniak et al. .......... 370/248
5,901,141 A * 5/1999 Gruber et al. ............... 370/248
6,122,254 A * 9/2000 Aydemir et al. ............. 370/235
6,134,249 A * 10/2000 Nakao ......................... 370/528
6,269,330 B1 * 7/2001 Cidon et al. .................. 714/43

OTHER PUBLICATIONS

IEEE Dictionary of Stndard terms. Seventh edition, IEEE, 2000 (pp. 1, 2 and 874).*

* cited by examiner

*Primary Examiner*—Dmitry Levitan
(74) *Attorney, Agent, or Firm*—Venable LLP; Michael A. Sartori; Catherine M. Voorhees

(57) ABSTRACT

This invention provides an improved data transferring method performed in a communication network comprising a management system M1 and a plurality of nodes K1–K3. Since the management system M1 collectively manages the algorithm information that indicates algorithm possessed in each node, if the fist node does not have algorithm needed for processing a certain packet, the first node can find the second node having the algorithm by inquiring the network management element M1. In addition, the first node can transfer the certain packet to the second node to process the certain packet by using the algorithm.

4 Claims, 3 Drawing Sheets

NETWORK MANAGEMENT METHOD AND COMMUNICATIONS NETWORK SYSTEM

BACKGROUND OF THE INVENTION

1. Field of the Invention

The present invention generally relates to a network management method applied to a communications network system, such as a public telephone network and a data communication network.

2. Description of the Related Art

In general, a conventional communication network system comprises a plurality of nodes each having a switching function and terminal equipments (TEs). The system further comprises a network management system to monitor traffic status of network communications and to manage establishment of roundabout routes. The network management system is then connected to each node via a control line, and the management of the network communication is performed via the control lines. For that reason, it is unavoidable to increase the number of control lines and control information in proportion to the number of nodes. Accordingly, the increase in the control information is a burden to the network management system, and the total traffic on the conventional communication network system also increases.

Furthermore, it is feared that the conventional communication network system can not accept new communication technology or cope with new communication service. For example, it has been developed that a node executes a program appended to a received user packet to assist transferring operations. If the program commands that the node makes a plurality of replicas of the user packet and transfers the replicas to a plurality of nodes respectively, the network management system can not manage traffic congestion on the conventional communication network system. As a result, the whole communication on the communication network system would become unusable.

SUMMARY OF THE INVENTION

It is therefore an object of the present invention to provide an improved network management method to avoid the increase in the traffic due to transferring a protocol itself.

It is another object of the present invention to provide an improved communication network system to manage the traffic congestion due to a large number of replicas excessively generated by executing the particular program.

In order to achieve the above object of the present invention, a network management method performed in a communication network system comprising a plurality of nodes and a network management system, the method comprising steps of:
(a) selecting at least one network control item to be collected from each node at the network management system,
(b) sending, from the network management system to a first node, a user packet appending a control program that commands a node to provide, to the control program, information corresponding to the network control item,
(c) storing a first network control item of the first node in the control program based on executing the control program,
(d) transferring the user packet from the first node to a second node,
(e) storing a second network control item of the second node in the control program based on executing the control program,
(f) returning the user packet from the second node to the network management system, and
(g) managing the first and second nodes based on the first and second network control items.

Furthermore, in order to achieve another object of the present invention, a network management method performed in a communication network system comprising at a plurality of nodes and a network management system, the method comprising steps of:
(a) identifying and recording, at each of the plurality of nodes, header information in response to reception of a user packet,
(b) reporting, to the network management system from a first node, reception information when the first node receives same user packets having the same header information more than a predetermined number of times,
(c) giving notice of discard of a succeed user packet having the same header information from the network management system to each nodes, and
(d) discarding, at each node, the succeed user packet having the same header information according to the notice of discard form the network management system.

BRIEF DESCRIPTION OF THE DRAWINGS

A preferred form of the present invention is illustrated in the accompanying drawings in which.

DETAILED DESCRIPTION OF THE PREFERRED EMBODIMENTS

A. First Embodiment of the Invention

The first embodiment of the present invention will be described below with reference to a preferred embodiment in conjunction with the accompanying drawings.

Figure 1:
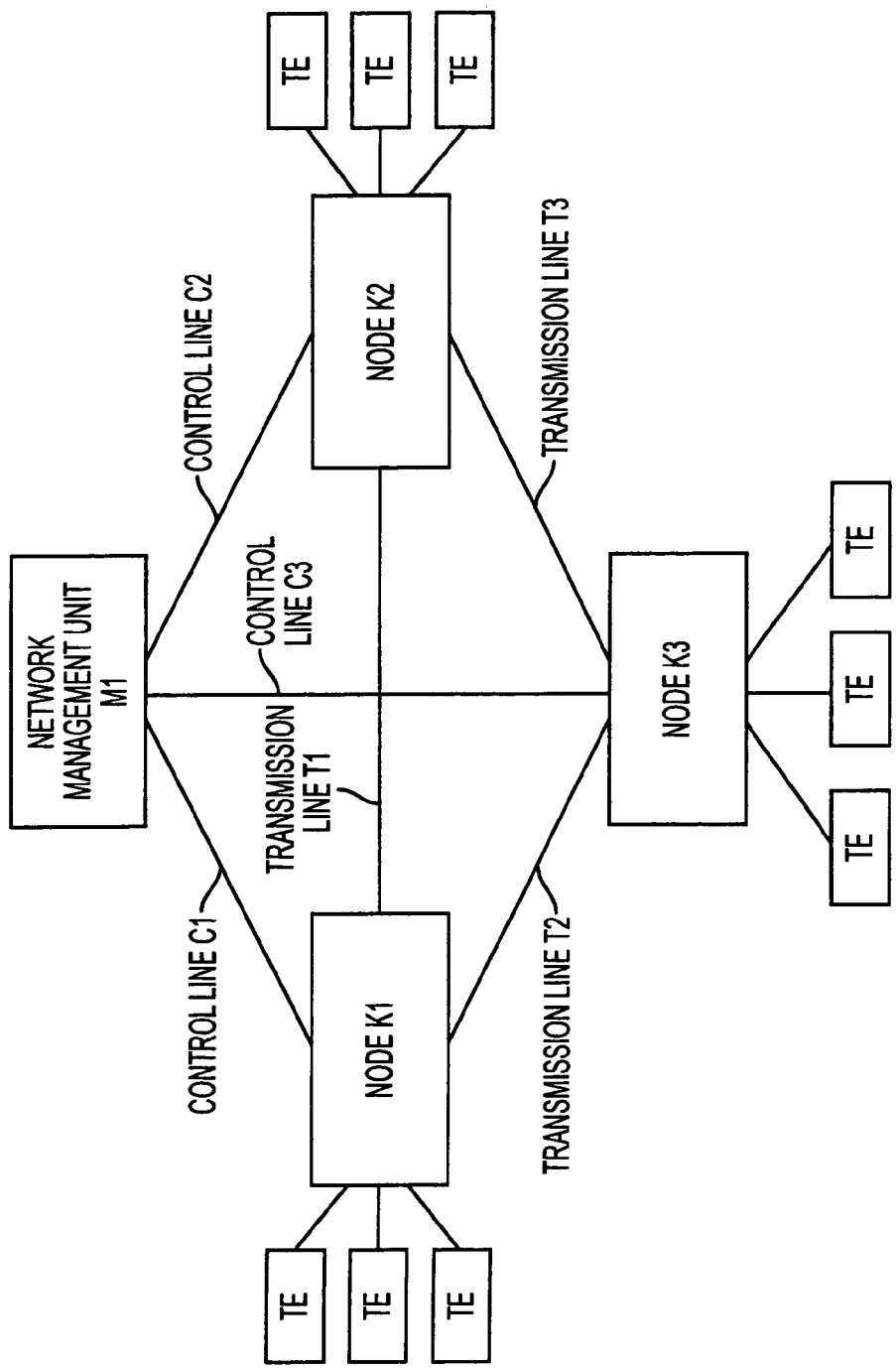
FIG. 1 is a simplified block diagram of a communication network system in accordance with the first embodiment of the invention.

FIG. 1 shows a communications network system comprising nodes K1–K3 and a network management system M1. Each of the nodes K1–k3 is equipped with a switching function, for example a switching system or a router, and accommodates terminal equipment (TE). Accordingly, when a packet is input to a node, the node transfers it to the addressed terminal equipment (TE) by performing optimum algorithm as a transferring function. In FIG. 1, the node K1 is connected to the nodes K2 and K3 via transmission lines T1 and T2 respectively, and the node K2 is connected to the node K3 via a transmission line T3. The management system M1 is connected to the nodes K1–K3 via control lines C1–C3 respectively.

Figure 2:
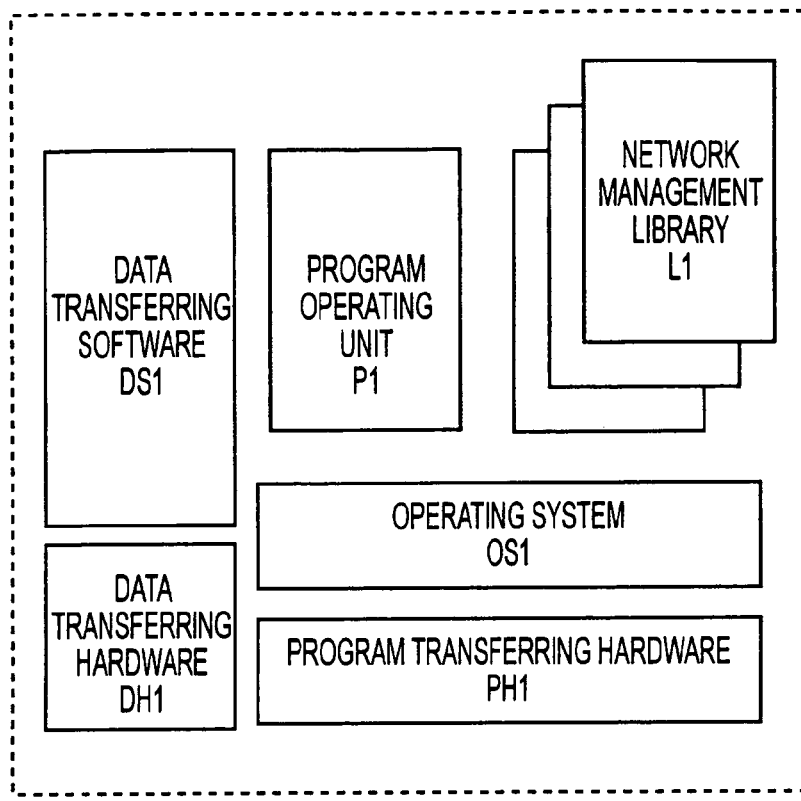
FIG. 2 is a simplified block diagram of a node according to the first embodiment of the invention.

FIG. 2 shows a simplified block diagram of the nodes K1–K3. As shown in FIG. 2, each of the nodes K1–K3 comprises a program operating unit P1, a network management library L1, an operating system OS1, a program transferring hardware PH1, a data transferring software DS1, and a data transferring hardware DH1. The program operating unit P1, the network management library L1, the operating system OS1 and the data transferring software DS1 are generally realized by software. The program transferring hardware PH1 and the data transferring hardware PH1 comprise a central processing unit (CPU), a memory and an I/O interface. In addition, the program transferring hardware PH1 is a device for transmitting/receiving a control program that is transferred to each node and is executed by each node. The operation of the control program will be described later. The data transferring hardware DH1 is also a device for transmitting/receiving packets.

The functions of the program-operating unit P1, the network management library L1 and the data transferring software DS1 are generally performed by application software. However, all or a part of the functions may be performed as a function of the operating system OS1 instead of the application software. Here it is assumed that the application software (the network management library L1, the operating system OS1 and the data transferring software DS1) is performed under the command of the operation system. Also, the data transferring software DS1 has a function of transferring user packets to destination addresses. The program-operating unit P1 has functions to execute the control program and other programs, which are transferred from the network management system M1 or other nodes. The network management library L1 provides functions to store and manage information regarding network topology and status of each node. In this case, as the information for the network management library L1, the rate of operation of a central processing element (CPU) and transferring speed of user packets can be obtained by transferring and executing the control program CP among the corresponding nodes. Here the rate of operation of the CPU is indicative of congestion rate or congestion status of each node to process user packets.

Figure 3:
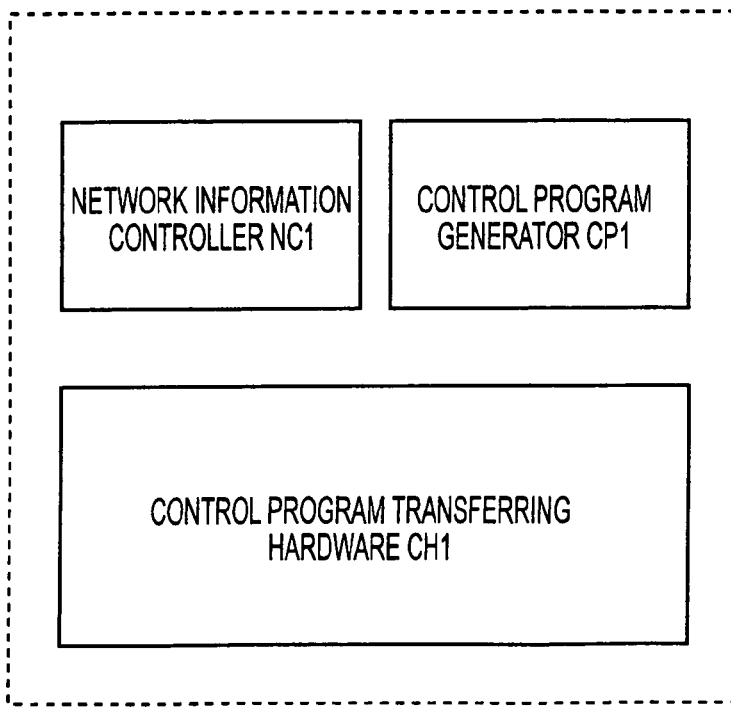
FIG. 3 is a simplified block diagram of a network management system in accordance with the first embodiment of the invention.

FIG. 3 shows a simplified block diagram of the management system M1, which comprises a network information controller NC1, a control program generator CP1 and a control program transferring hardware CH1. The network information controller NC1 and the control program generator CP1 are generally realized by software, and the control program transferring hardware CH1 comprises a central processing unit (CPU), a memory and an I/O interface. Although the network information controller NC1 and the control program generator CP1 are generally performed by application software, all or a part of the functions may be performed by an operating system instead of the application software. When the network management system M1 selects network control items necessary for control of the communication network system, the control program generator CP1 functions to generates a control program CP that commands to collect the network control items from each node. The control program generator CP1 also generates a user packet appending to the generated control program. The network information controller NC1 functions to store and manage the network control items provided by each node during the control program CP is transferred to each node in turn.

Next, an outline of a network management method according to this embodiment will be described below. In the conventional network management method, a network management system has communicated with each node to collect information necessary for management of a network system. However, in a network management method according to the first embodiment of the invention, when a network administrator selects the network control items necessary for management of a network system for network communication, the control program generator CP1 generates the control program CP to collect the network control items from each node. The control program CP is appended to a user packet, and then the user packet is transferred to all nodes or predetermined nodes in turn by the control program transferring hardware CH1. Consequently, a burden imposed to the network management system M1 can be lightened even if the number of nodes increases in the communication network system, because the network management system M1 need not to send the control program to each node. Further, the traffic for collecting the network control items from each node may be reduced to a minimum.

In this embodiment, for example, it is assumed that the user packet appending to the control program CP is first transferred to the node K1. As shown in FIG. 1, the control program CP is sent from the network management system M1 to the node K1 via the control line C1. In the node K1, the control program CP is then received at program transferring hardware PH1 and is provided to the program-operating unit P1 by way of the operating system OS1. In the program-operating unit P1, the control program CP is executed. If the control program CP commands to collect network control items, i.e. the rate of operation of a central processing element (CPU) and transferring speed of user packets, the network control items are obtained by accessing the network management library L1 of the node K1. When completing the operation of the control program CP, the network control items are accumulated in the control program CP. Alternatively, the network control items can be accumulated in a predetermined portion of the user packet that is appending to the control program CP.

Next, the control program CP is transferred to a predetermined node (i.e. the node K3) via transmission line T2 by providing a next destination address according to a routing table in a network management library L1 of the node K1. The node K3 receives and executes the control program CP, and then network control items of the node K3 are accumulated in the control program CP like the above-mentioned operation of the node K1. The control program CP is further transferred to a predetermined next node (i.e. the node K2) via transmission line T3 by providing a next destination address according to a routing table in a network management library L1 of the node K3. The node K2 also receives and performs the control program CP, and network control items of the node K2 are accumulated in the control program CP. This operation is repeatedly performed until the control program CP is transferred to all nodes or predetermined nodes. In this embodiment, the control program CP is finally transferred to the network management system M1 after the node K2 executes the control program CP. That is, the control program CP makes the rounds of the nodes K1–K3 in turn and then returns to the network management system M1. The control program CP thus provides the network control items obtained from each of the nodes K1–K3 to the network information controller NC1 of the network management system M1.

With regard to the transferring the control program CP among nodes according to the routing table in the network management library L1, transferring information stored in the routing table can be obtained in a well-known transferring technique. For example, the corresponding two nodes communicates mutually or the corresponding two nodes inquire the transferring information of the network management system M1.

According to the first embodiment of the invention, a burden imposed to the network management system M1 can be lightened, since the network management system M1 need not to communicate with each node to collect the network control items. Also, as a result of the control program CP is transferred to each node and each node executes the control program CP, the total traffic in the communication network system can be reduced abundantly.

In this embodiment, it has been described that the network management library L1 of each node has a function of collecting the network control items by executing the received control program CP. Further, it can be realized that the network management library L1 functions to set up the network libraries by executing the control program CP. For example, the network management library L1 of each node has functions to detect and solve congestion of the traffic as a congestion control operation, and the network management library L1 performs the congestion control operation in response to reception of the control program CP.

As mentioned above, by reason of the control program CP performs not only collecting the network control items of each node but also setting up the network library, the network management system M1 can rapidly control each node in response to condition of the communication network system.

B. Second Embodiment of the Invention

The second embodiment of the invention will be described below. Since a communication network system according to the second embodiment is the same as that of the first embodiment as shown in FIG. 1, accordingly the explanation will be omitted here.

Figure 4:
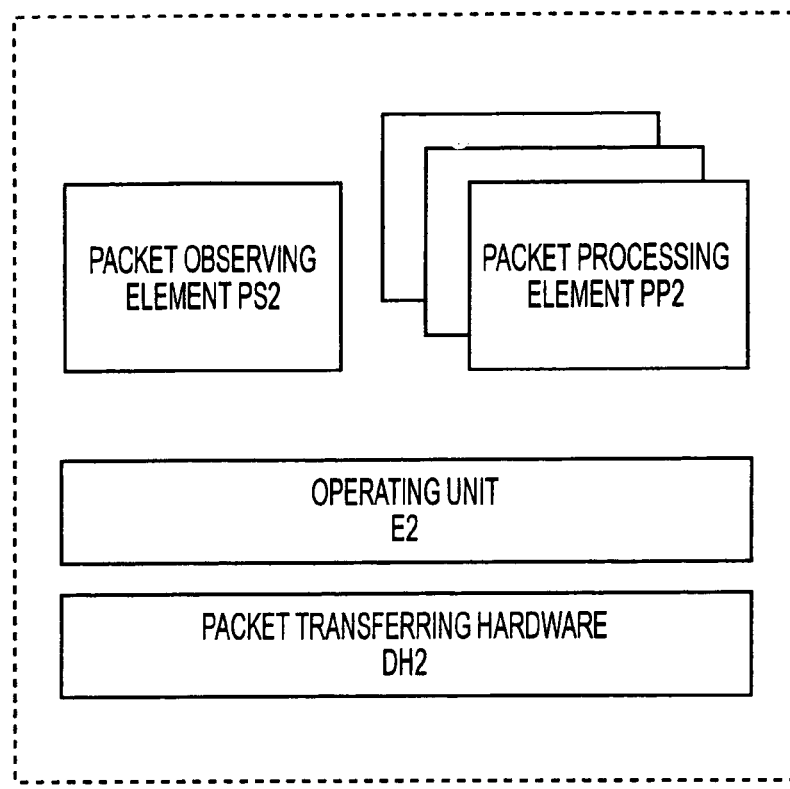
FIG. 4 is a simplified block diagram of a node according to the second embodiment of the invention.

FIG. 4 shows a block diagram of nodes K1–K3 according to the second embodiment of the present invention. As shown, each of the nodes K1–K3 comprises a packet-observing element PS2, a packet-processing element PP2, an operating unit E2 and a packet transferring hardware DH2. In general, the packet-observing element PS2, the packet-processing element PP2 and the operating unit E2 are realized by software, and the packet transferring hardware DH2 comprises a central processing element (CPU), a memory and I/O interface. The packer-observing element PS2 identifies and records header information of a received packet. In addition, if packets having the same header information are received more than a predetermined number of times (i.e. five times), the packer-observing element PS2 reports the reception to the network management system M1 via a control line. Incidentally, after confirming the reception of the five packets and reporting the reception to the network management system M1, the packet-processing element PP2 immediately discards succeed packets having the same header information. Further, if one node reports the reception information of the five packets having the same header information to the network management system M1, the network management system M1 then gives notice to other nodes. As a result, the packet-processing element PP2 of each node immediately discards the packets having the same header. In such case, the reception information and the notice include header information of the same user packet in order to identify, at each node, received user packets as a user packet to be discarded.

With regard to the reception of the same header, each node can regard as the same header when all or a particular portion of header of the former packet is the same as that of the later one. For example, as the particular portion, a destination address, a destination port number of the destination node, a source address or a source port number of the source node can be utilized.

Here the function of the packet-observing element PS2 is generally realized by application software. However, all or a part of the function can be realized by an operating system. The operating unit E2 provides a desirable environment where the functions of the packet-observing element PS2 and the packet-processing element PP2 can be performed. In general, the function of the operating unit E2 is realized by the operation system. However, all or a part of the function can be performed by application software. The operating unit E2 also provides a function of transmitting and receiving packets between the operating unit E2 and the packet transferring hardware DH.

Figure 5:
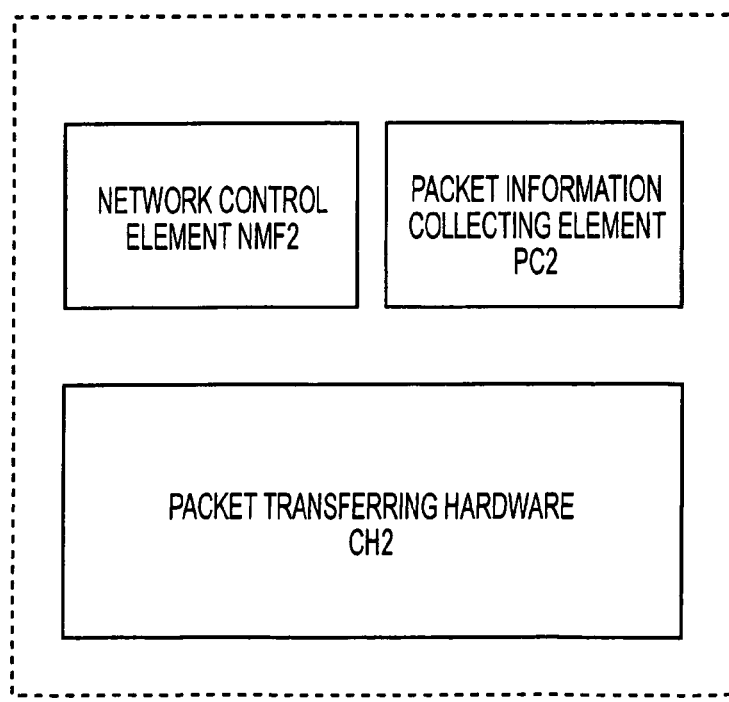
FIG. 5 is a simplified block diagram of a network management system in accordance with the second embodiment of the invention.

FIG. 5 shows a block diagram of the network management system M1 according to the second embodiment of the present invention, which comprises a network control element NMF2, a packet information collecting element PC2 and a packet transferring hardware CH2. The network control element NMF2 and the packet information collecting element PC2 are generally realized by software, and the packet transferring hardware CH2 comprises a central processing element (CPU), a memory and I/O interface. The network control element NMF2 has functions necessary for managing the communication network system and the functions are generally realized by application software. However, all or a part of the functions can be performed by an operating system. When one node reports the reception of five packets having the same header to the network management system M1, the network control element NMF2 also has a function to provide a control signal including the its header information and a discarding order to each node. As a result, each node immediately discards specific packets that are indicated to header information in response to the control signal. The header information is collected by the packet-processing element PP2 of the node that receives the five packets having the same header information and then is sent to the network control element NMF2 of the network management system M1.

The data transferring operation performed on the communication network system will be described below. In this embodiment, it is assumed that each node has a program that commands to duplicate a received packet and to transfer the duplicated packets to a plurality of nodes, and the node K1 first receives the received packet. In such case, the packet-observing element PS2 of the node K1 identifies and records header information of the packet, which indicates two destination addresses for transferring two different nodes (i.e. the nodes K2 and K3). The packet is duplicated and then is transferred to the nodes K2 and K3 respectively. The node K2 duplicates the received packet and transfers them to two different nodes. Similarly, the node K3 duplicates the received packet and transfers them to two different nodes. If repeating these operations, each node is congested with processing a large number of the duplicated packets. However, as mentioned above, when one node receives the duplicated packets five times, the node reports the reception of the five duplicated packets the to the network management system M1. In response to the report from the one node, the network management system M1 gives notice to other nodes such that the packet-observing element PS2 of each node discards the duplicated packet having the same header. As a result, each node can discard the duplicated packets without duplicating and transferring the duplicated packet based on the notice from the network management system M1.

As mentioned above, according to the second embodiment of the invention, it is possible to avoid an occurrence of congestion on the communication network system due to a function of duplicating a received packet and transferring them to different nodes.

In the second embodiment, one node reports the reception of the five duplicated packets to the network management system M1, however it can be realized that the one node directly report the reception to other nodes such that other nodes discards the duplicated packets.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A network management method performed in a communication network system comprising a plurality of nodes and a network management system, the method comprising steps of:
   generating software including a control program that commands a first node to transfer at least one first packet from the first node to a second node and to collect at least one first network control item of the first node, and commands the second node to transfer at least one second packet from the second node to the network management system and to collect at least one second network control item of the second node at the network management system;
   transferring at least one third packet appending the software including the control program from the network management system to the first node;
   receiving the third packet from the network management system at the first node;
   generating the software including the control program from the third packet;
   storing the first network control item of the first node based on executing the software;
   transferring the first packet appending the software and the first network control item from the first node to the second node;
   receiving the first packet from the first node at the second node,
   generating the software including the control program from the first packet,
   storing the second network control item of the second node based on executing the software,
   transferring the second packet appending the software, the first network control item and the second network control item from the second node to the network management system,
   receiving the second packet from the second node at the network management system, and
   managing the first node and the second node based on the first network control item and the second network control item, wherein the first network control item and the second network control item detect the packet received from the second node.

2. A network management method according to claim 1, further comprising a step of generating the software including the control program at the network management system in response to selecting the first network control item of the first node and the second network control item of the second node.

3. A communication network system comprising:
   a network management system
   a first node, connected to the network management system; and
   a second node, connected to the management system and the first node;
   wherein the network management system comprises:
   a first generator to generate software including a control program that commands a first node to transfer at least one first packet from the first node to a second node and to collect at least one first network control item of the first node, and commands the second node to transfer at least one second packet from the second node to the network management system and to collect at least one second network control item of the second node;
   a first transferring hardware to transmit at least one third packet appending the software including the control program to a first node;
   the first transferring hardware to receive the second packet from the second node; and
   a network management controller to manage the first node and the second node based on the first network control item and the second network control item, wherein the first network control item and the second network control item detect the second packet received from the second node;
   wherein the first node comprises:
   a second transferring hardware to receive the third packet from the network management system;
   a second generator to generate the software including the control program from the third packet;
   a first controller to store the first network control item of the first node based on executing the software; and
   the second transferring hardware to transmit the first packet appending the software and the first network control item to the second node;
   wherein the second node comprises:
   a third transferring hardware to receive the first racket from the first node;
   a third generator to generate the software including the control program from the first packet;
   a second controller to store the second network control item of the second node based on executing the software; and
   the third transferring hardware to transmit the second packet appending the software, the first network control item and the second network control item to the network management system.

4. A communication network system according to claim 3, wherein the first generator to generate the software including the control program in response to selecting the first network control item of the first node and the second network control item of the second node.

* * * * *